United States Patent
Bailey et al.

(10) Patent No.: US 10,096,020 B2
(45) Date of Patent: *Oct. 9, 2018

(54) COMBINATION PAYMENT CARD AND METHODS THEREOF

(71) Applicant: Vantiv, LLC, Symmes Township, OH (US)

(72) Inventors: Bryan T. Bailey, Florence, KY (US); Edward D. Paciolla, Canton, GA (US)

(73) Assignee: Worldpay, LLC, Symmes Township, OH (US)

(*) Notice: Subject to any disclaimer, the term of this patent is extended or adjusted under 35 U.S.C. 154(b) by 381 days.

This patent is subject to a terminal disclaimer.

(21) Appl. No.: 14/221,792

(22) Filed: Mar. 21, 2014

(65) Prior Publication Data

US 2014/0207683 A1 Jul. 24, 2014

Related U.S. Application Data

(63) Continuation-in-part of application No. 14/221,420, filed on Mar. 21, 2014, which is a continuation of application No. 13/599,538, filed on Aug. 30, 2012, now Pat. No. 8,712,854.

(51) Int. Cl.
| | |
|---|---|
| G07G 1/12 | (2006.01) |
| G06Q 20/34 | (2012.01) |
| G06Q 20/28 | (2012.01) |
| G06Q 20/06 | (2012.01) |
| G06Q 20/22 | (2012.01) |
| G06Q 20/20 | (2012.01) |
| G06Q 30/02 | (2012.01) |

(52) U.S. Cl.
CPC ......... *G06Q 20/3572* (2013.01); *G06Q 20/06* (2013.01); *G06Q 20/20* (2013.01); *G06Q 20/202* (2013.01); *G06Q 20/227* (2013.01); *G06Q 20/28* (2013.01); *G06Q 20/349* (2013.01); *G06Q 30/0207* (2013.01)

(58) Field of Classification Search
USPC .......................................... 705/34
See application file for complete search history.

(56) References Cited

U.S. PATENT DOCUMENTS

| | | | | |
|---|---|---|---|---|
| 8,240,557 B2* | 8/2012 | Fernandes | ............... | G06Q 20/04 235/379 |
| 2002/0032628 A1* | 3/2002 | Ferrer | .................... | G06Q 30/06 705/35 |
| 2006/0208065 A1* | 9/2006 | Mendelovich | ......... | G06Q 20/04 235/380 |
| 2012/0226604 A1* | 9/2012 | Isaacson | ................ | G06Q 20/10 705/39 |
| 2015/0278773 A1* | 10/2015 | Rolf | ....................... | G06Q 20/02 705/39 |

\* cited by examiner

*Primary Examiner* — Luna Champagne
(74) *Attorney, Agent, or Firm* — Bookoff McAndrews, PLLC

(57) ABSTRACT

Systems and methods for processing payment transactions using combination payment cards. The combination payment card is associated with an open-loop account and one or more closed-loop accounts. Transaction information is received from a point-of-sale device. At least one of the closed-loop and open-loop account is debited.

19 Claims, 11 Drawing Sheets

| EVENT | OPEN-LOOP PREPAID ACCOUNT BALANCE | CLOSED-LOOP PREPAID ACCOUNT BALANCE (MERCHANT A) |
|---|---|---|
| ISSUANCE OF COMBINATION PAYMENT CARD | $50.00 | $5.00 |
| $10.00 PURCHASE AT MERCHANT B | $40.00 | $5.00 |
| $3.00 PURCHASE AT MERCHANT A | $40.00 | $2.00 |
| $30.00 PURCHASE AT MERCHANT C | $10.00 | $2.00 |
| $5.00 PURCHASE AT MERCHANT A | $7.00 | $0.00 |

FIG. 1

| EVENT | OPEN-LOOP PREPAID ACCOUNT BALANCE | CLOSED-LOOP PREPAID ACCOUNT BALANCE (MERCHANT A) | CLOSED-LOOP PREPAID ACCOUNT BALANCE (MERCHANT B) |
|---|---|---|---|
| ISSUANCE OF COMBINATION PAYMENT CARD | $100.00 | $20.00 | $5.00 |
| $70.00 PURCHASE AT MERCHANT C | $30.00 | $20.00 | $5.00 |
| $5.00 PURCHASE AT MERCHANT B | $30.00 | $20.00 | $0.00 |
| $15.00 PURCHASE AT MERCHANT A | $30.00 | $5.00 | $0.00 |

| EVENT | OPEN-LOOP PREPAID ACCOUNT BALANCE | CLOSED-LOOP POOLED GIFT CARD ACCOUNT BALANCE (MERCHANT A & MERCHANT B) |
|---|---|---|
| ISSUANCE OF COMBINATION PAYMENT CARD | $50.00 | $50.00 |
| $10.00 PURCHASE AT MERCHANT A | $50.00 | $40.00 |
| $20.00 PURCHASE AT MERCHANT C | $30.00 | $40.00 |
| $50.00 PURCHASE AT MERCHANT B | $20.00 | $0.00 |

COMBINATION PAYMENT CARD AND METHODS THEREOF

CROSS-REFERENCE TO RELATED APPLICATION

This application which is a continuation-in-part of prior U.S. patent application Ser. No. 14/221,420 filed Mar. 21, 2014 entitled "COMBINATION PAYMENT CARD AND METHODS THEREOF," which is a continuation of prior U.S. patent application Ser. No. 13/599,538, filed Aug. 30, 2012 entitled "SYSTEMS, METHODS AND APPARATUS FOR PAYMENT PROCESSING," both of which are incorporated herein by reference in their entirety.

TECHNICAL FIELD

This application relates generally to financial transaction processing, and more particularly, to the use and processing of closed-loop cards and open-loop cards.

BACKGROUND

Prepaid cards are becoming increasingly popular. Such prepaid cards may also be referred to as a "gift card" or a "stored value card." These cards can often be purchased at a retail location, or a financial institution, for a specified amount, e.g., twenty dollars, or for a non-denominated amount whereby the cardholder or other party can designate the exact funding amount. Prepaid cards can be associated with open-loop type accounts or closed-loop type accounts. Open-loop type cards may be redeemed at many retail locations, for example, wherever the prepaid cards' sponsoring network, such as VISA, MASTERCARD, DISCOVER, or AMERICAN EXPRESS, is accepted. By comparison, closed-loop type cards are typically only honored at limited locations, such as at designated merchants.

SUMMARY

In accordance with one embodiment, a non-transitory computer readable medium has instructions stored thereon which when executed by a processor cause the processor to receive transaction information from an acquirer through a sponsoring network, the transaction information comprising an authorization request, a payment card account number, and a merchant identifier. The instructions also cause the processor to determine whether the payment card account number identifies a combination payment card, wherein the combination payment card has an assigned card number that is associated with both a closed-loop account and an open-loop account, wherein the closed-loop account associated with the assigned card number is affiliated with a closed-loop merchant and the open-loop account associated with the assigned card number is affiliated with the sponsoring network. When the payment card account number identifies the combination payment card, the instructions cause the processor to determine, based on the merchant identifier, whether the transaction information is received from the closed-loop merchant. When the received transaction information is from the closed-loop merchant, the instructions cause the processor to determine whether the closed-loop account has sufficient funds. When the closed-loop account has sufficient funds, the instructions cause the processor to cause an authorization of sale to be transmitted to the acquirer through the sponsoring network. When the received transaction information is not from the closed-loop merchant, the instructions cause the processor to determine whether the open-loop account has sufficient funds. When the open-loop account has sufficient funds, the instructions cause the processor to cause an authorization of sale to be transmitted to the acquirer through the sponsoring network. When the payment card account number is not associated with the combination payment card, the instructions cause the processor to determine whether a payment card account identified by the payment card account number has sufficient funds.

In accordance with another embodiment, a non-transitory computer readable medium has instructions stored thereon which when executed by a processor cause the processor to receive transaction information from an acquirer through a sponsoring network, the transaction information comprising an authorization request and a payment card account number. The instructions also cause the processor to determine whether the payment card account number is associated with a combination payment card, wherein the combination payment card has an assigned card number that is associated with both a closed-loop prepaid account that is affiliated with a merchant and a prepaid account that is affiliated with the sponsoring network. When the payment card account number is associated with a combination payment card and the transaction information is received from the merchant, the instructions cause the processor to cause an authorization to be transmitted to the acquirer through the sponsoring network when the closed-loop prepaid account has sufficient funds to cover the authorization request. When the payment card account number is associated with a combination payment card and the transaction information is not received from the merchant, the instructions cause the processor to determine whether the prepaid account has sufficient funds to cover the authorization request. When the payment card account number is not associated with the combination payment card, the instructions cause the processor to determine whether a payment card account associated with the payment card account number has sufficient funds to cover the authorization request.

In accordance with another embodiment, a payment processing system comprises a combination payment card, wherein the combination payment card has an assigned card number that is associated with both a closed-loop account and an open-loop account, wherein the closed-loop account associated with the assigned card number is affiliated with a closed-loop merchant and the open-loop account associated with the assigned card number is affiliated with a sponsoring network. The payment processing system also comprises a payment processor, wherein the payment processor is one of an acquirer and an issuer. The payment processor is configured to receive transaction information comprising an authorization request, a payment card account number, and a merchant identifier and determine whether the payment card account number identifies the combination payment card. When the payment card account number identifies the combination payment card, it is determined, based on the merchant identifier, whether the transaction information is associated with the closed-loop merchant. When the received transaction information is associated with the closed-loop merchant, it is determined whether the closed-loop account has sufficient funds. When the closed-loop account has sufficient funds, an authorization of sale is caused to be transmitted. When the received transaction information is not from the closed-loop merchant, it is determined whether the open-loop account has sufficient funds. When the open-loop account has sufficient funds, an authorization of sale is caused to be transmitted. When the payment card account number is not associated with the combination payment card, it is determined whether a payment card account identified by the payment card account number has sufficient funds.

BRIEF DESCRIPTION OF THE DRAWINGS

It is believed that certain embodiments will be better understood from the following description taken in conjunction with the accompanying drawings in which:

FIGS. 1-3 show example balances of various open-loop and closed-loop accounts associated with combination payment cards.

DETAILED DESCRIPTION

Figure 4:
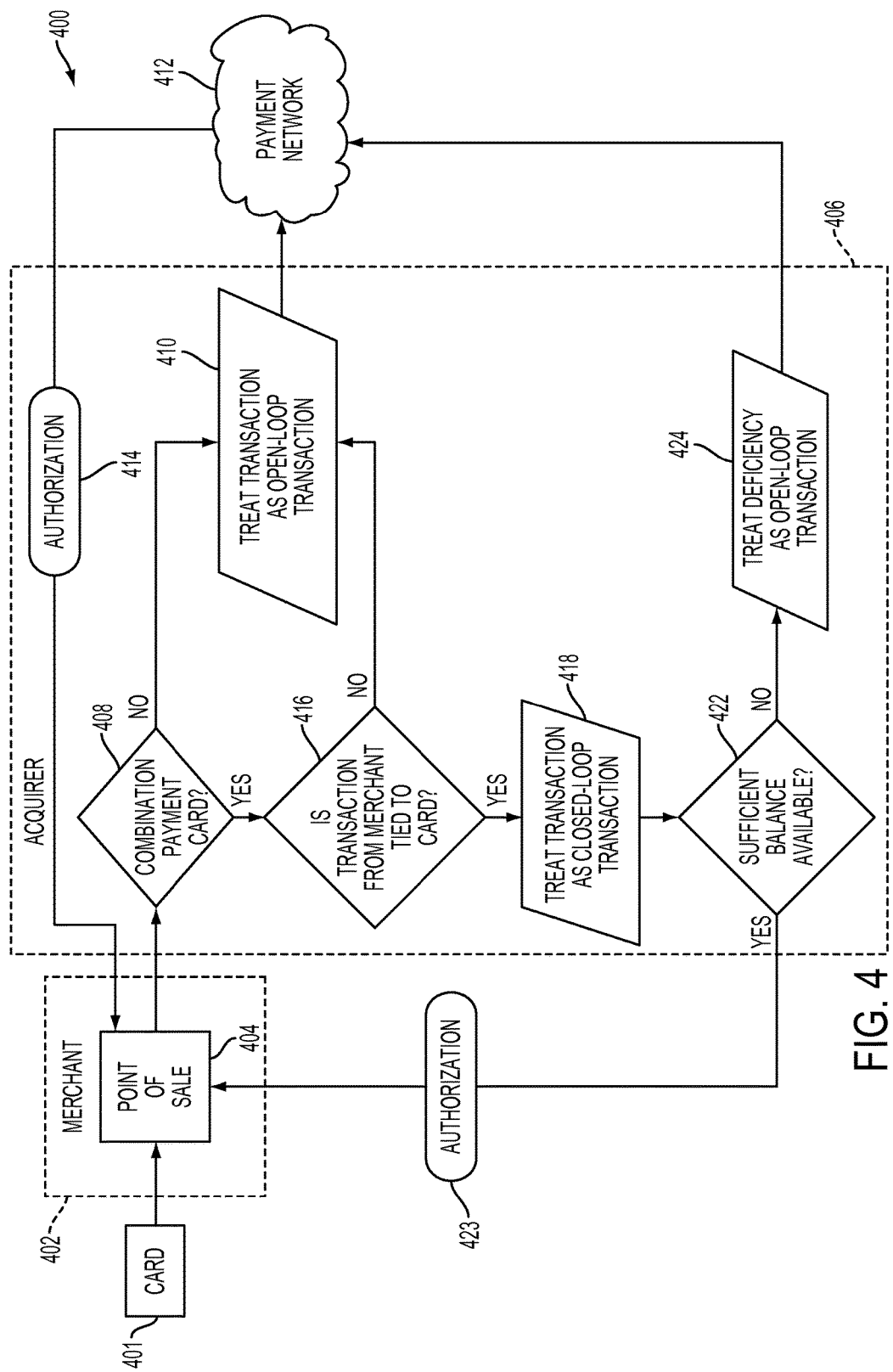
FIGS. 4-6 show block diagrams of example payment systems with acquirer-side combination payment card processing in accordance with various non-limiting embodiments.

Various non-limiting embodiments of the present disclosure will now be described to provide an overall understanding of the principles of the structure, function, and use of the financial transaction processing systems and methods disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with the embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

As used herein, the term "prepaid account" can refer to any account capable of having a balance that can be funded in advance, which when used in a financial transaction the balance can be debited. Prepaid accounts can be associated with many instruments, such as, but not limited to, a stored value account, a gift card account or, a payroll card account.

As used herein, the term "prepaid card" can refer to any access device associated with a prepaid account as the term is used herein. Example prepaid cards can include, but are not limited to, a gift card, a payroll card, a stored value card, a smart card, or a contactless card. Prepaid cards may be embodied either as a tangible medium form factor or as an electronic or virtual-type instrument provided by a merchant, a retailer, an employer, a merchant bank, an employer bank, a financial institution, or any other suitable type of entity. In one example, a prepaid card can be a denominated plastic card with a predetermined monetary amount associated with the card. In another example, a prepaid card can be an electronic certificate with a predetermined monetary amount associated with the certificate. In other examples, a prepaid card may be a non-denominated card, whereby a consumer can designate the value to fund one or more of the associated account. Example prepaid cards may include or have associated therewith, but are not limited thereto, one or more of the following: an account number, a card number, a personal identification number, a magnetic stripe, a bar code, and/or a contactless transaction means.

The presently disclosed embodiments are generally directed to systems and methods for processing a transaction involving a prepaid card. Such prepaid cards can be tied, linked or otherwise associated to both an open-loop prepaid account and one or more closed-loop prepaid accounts. The prepaid card for use with the embodiments disclosed herein may be referred to herein as a "combination payment card" or "combination account card", as the prepaid card is associated with a variety of account types.

With regard to the open-loop prepaid account associated with the combination payment card, the combination payment card can be used at any location where the cards' sponsoring network, such as VISA, MASTERCARD, DISCOVER, or AMERICAN EXPRESS, is accepted. The open-loop prepaid accounts of the combination payment card can be functionally similar to, for example, payment cards commonly referred to as general purpose reloadable cards. In some embodiments, the card's sponsoring network can be identified on the face of the combination payment card, such as by a logo or other indicia. Generally, open-loop prepaid accounts can be funded by a cardholder, another person, a company, a government agency, and so forth. These accounts are not typically linked to a cardholder's bank account or other lines of credit. Furthermore, only funds that are loaded onto the card can be spent by the cardholder.

The closed-loop prepaid account associated with the combination payment card, sometimes referred to as a merchant gift card account, can be used at one or more particular merchants that are associated with the closed-loop prepaid account. In some embodiments, the one or more particular merchants that are associated with the closed-loop prepaid account can be identified on the face of the combination payment card. As is to be appreciated, a wide variety of merchants can be associated with the combination payment card, such as, without limitation, retailers, restaurants, hotels, airlines, or any other provider of goods or services.

The cardholder can use the combination payment card for payment at a variety of merchant types. A first merchant type that can accept the combination payment card is any merchant within the cards' sponsoring network. In addition, a second merchant type that can accept the combination payment card is any merchant associated with the closed-loop prepaid account that is linked to the combination payment card. When the combination payment card is used by a cardholder to make a purchase at a merchant that is not associated with the closed-loop prepaid account, the combination payment card can functionally perform as an open-loop prepaid card. In other words, at those types of merchants an account associated with the open-loop prepaid account can be debited for the purchase. By comparison, when the combination payment card is used to make a purchase at a merchant that is associated with the closed-loop prepaid account, any funds available in the closed-loop prepaid account can be utilized to pay for, or at least partially pay for, the purchase.

It is noted that the terms "purchase" and "merchant" are herein used broadly, as combination payment cards can be used to make any suitable type of purchase from any suitable type of merchant. For example, the purchase can be for, without limitation, goods or services from a brick and mortar store, an e-commerce website, a public utility, and so forth. Combination payment cards can also, in certain circumstance, be used to make loan payments, credit card payments, and so forth. All such suitable implementations and variations are intended to be covered by the present disclosure.

In some embodiments, when making a purchase using the closed-loop prepaid account, if the available funds in the closed-loop prepaid account do not cover the full purchase amount, the payment for the deficiency can be sought from the open-loop prepaid account that is associated with the combination payment card. Alternatively, when the available funds in the closed-loop prepaid account do not cover the full purchase amount, the cardholder can subsidize the deficiency using another form of payment, such as a cash payment.

In some embodiments, for purchases transacted at a merchant associated with the closed-loop prepaid account, the cardholder can be prompted at the point-of-sale terminal to identify which of the accounts associated with the combination payment card should be debited. In other words, the cardholder can be prompted to determine if the purchase should be charged to the cardholder's open-loop prepaid account or charged to the cardholder's closed-loop prepaid account.

The combination payment card can be assigned a card number, such as an Issuer Notification Number (IIN) or a Bank Identification Number (BIN), which is provided on the face of the card. The combination payment card can comprise a variety of markings or identification means known in the art, such as a magnetic stripe, a bar code, a QR code, and/or a contactless transaction means for conveying the card number to a point-of-sale terminal The card number can be formatted or structured so that the combination payment card can be used by a cardholder to make purchases using the associated open-loop prepaid account at any point-of-sale location (including both brick and mortar locations and online locations) within the sponsoring network. Thus, with respect to merchant processors (sometimes referred to as acquirers) that perform payment processing for merchants that are not associated with the closed-loop prepaid account of the combination payment card, the combination payment card is functionally similar to a standard prepaid open-loop card. Merchants that are not associated with the closed-loop prepaid account of the combination payment card are sometimes referred to herein as "open-loop merchants." When the combination payment card is used to make a purchase at one or more merchants associated with the closed-loop prepaid account with the combination payment card, the associated closed-loop prepaid account can be utilized. Merchants that are associated with the closed-loop prepaid account of the combination payment card are sometimes referred to herein as "closed-loop merchants." Thus, the single card number assigned to the combination payment card can trigger the debiting of an open-loop prepaid account or a closed-loop prepaid account, depending on the merchant from which authorization is sought.

As described in more detail below, in some embodiments, an acquirer that performs payment processing for one of the closed-loop merchants can make the determination as to which payment processing technique should be used in accordance with one or more transaction processing rules. The transaction processing rules can be based on, for example, the card number that the acquirer receives during a payment transaction from the point-of-sale device. Acquirers that perform payment processing for open-loop merchants may be generally unaware that the payment card is even a combination payment card or is linked to any closed-loop accounts. Additionally or alternatively, an issuer of the combination payment card the performs payment processing (sometimes referred to as issuers) can make the determination as to which payment processing technique should be used in accordance with one or more transaction processing rules. Similar to acquirer-side processing, the transaction processing rules can be based on, for example, the card number that the issuer receives during a payment transaction. With an issuer making the determination, acquirers that perform payment processing for closed-loop merchants may be generally unaware that the payment card is even a combination payment card or is linked to any closed-loop accounts.

For purposes of illustration, FIGS. 1-3 show the impact of various events on the balances of the various open-loop and closed-loop prepaid accounts that are associated with example combination payment cards. As is to be readily appreciated, the various balances of the combination payment cards presented in FIGS. 1-3 are merely for illustration purposes.

Referring first to FIG. 1, a combination payment card 100 having a payment card account number 101 is issued at event 102 that is associated with, linked to, or otherwise affiliated with an open-loop prepaid account and a closed-loop prepaid account (e.g., merchant gift card account). For the purposes of illustration, the closed-loop prepaid account is affiliated with Merchant A. At issuance, the combination payment card 100 has an open-loop prepaid account balance of $50.00 and a closed-loop prepaid account balance of $5.00. In some embodiments, the initial value of the closed-loop prepaid account can be substantially equal to an activation fee that is associated with the combination payment card 100. At event 104, the cardholder makes a $10.00 purchase at Merchant B. As shown, the prepaid account open-loop prepaid account is debited to reduce the balance to $40.00. The balance of the closed-loop prepaid account remains the same. At event 106, the cardholder makes a $3.00 purchase at Merchant A. As shown, the closed-loop prepaid account is debited to reduce the balance to $2.00. The balance of the open-loop prepaid account prepaid remains the same. At event 108, the cardholder makes a $30.00 purchase at Merchant C. The open-loop prepaid account prepaid is debited to reduce the balance to $10.00. At event 110, the cardholder makes a $5.00 purchase at Merchant A. The available balance in the gift card account is $2.00. Accordingly, the available $2.00 in the gift card account is first applied to the transaction thereby reducing the balance in the gift card account to zero. The $3.00 deficiency, which is amount still due to cover the transaction at event 110, is then debited from the open-loop prepaid account prepaid to reduce the balance to $7.00.

Referring now to FIG. 2, a combination payment card 200 having a payment card account number 201 is issued at event 202 that is associated with, linked to, or otherwise affiliated with an open-loop prepaid account and two different closed-loop accounts (sometimes referred to as gift card accounts), namely a Merchant A closed-loop account and a Merchant B closed-loop account. As is to be appreciated, while two affiliated gift card accounts are illustrated, any suitable number of closed-loop prepaid accounts can be affiliated with the combination payment card 200. At issuance, the combination payment card 200 has an open-loop prepaid account balance of $100.00, a Merchant A gift card account balance of $20.00, and a Merchant B gift card account balance of $5.00. At event 204, the cardholder makes a $70.00 purchase at Merchant C. As shown, the open-loop prepaid account prepaid is debited to reduce the balance to $30.00. The balances of the closed-loop prepaid accounts remain the same. At event 206, the cardholder makes a $5.00 purchase at Merchant B. As shown, the Merchant B gift card account is debited to reduce the balance to zero. The balances of the open-loop prepaid account prepaid and Merchant A gift card account remain the same. At event 208, the cardholder makes a $15.00 purchase at Merchant A. The Merchant A gift card account balance is debited to reduce the balance to $5.00. Similar to combination payment card 100, a deficiency of payment due from either of the closed-loop prepaid accounts can be sought from the open-loop prepaid account prepaid. In some embodiments, a deficiency of payment due from one of the closed-loop prepaid accounts can be sought from the other closed-loop prepaid accounts linked to the combination payment card Referring now to FIG. 3, a combination payment card 300 having a payment card account number 301 is issued at event 302 that is associated with, linked to, or otherwise affiliated with an open-loop prepaid account prepaid and a pooled gift card account. In the illustrated embodiment, the pooled gift card account is tied to Merchant A and Merchant B such that purchases at either Merchant A or Merchant B can be paid from the pooled gift card account. As is to be appreciated, while two merchants are shown affiliated with the pooled gift card account, any suitable number of merchants can be affiliated with the pooled gift card account of combination payment card 300. At issuance, the combination payment card 300 has an open-loop prepaid account balance of $50.00 and a pooled gift card account balance of $50.00. At event 304, the cardholder makes a $10.00 purchase at Merchant A. As shown, the pooled gift card account balance is debited to reduce the balance to $40.00. The balance of the open-loop prepaid account remains the same. At event 306, the cardholder makes a $20.00 purchase at Merchant C. As shown, the open-loop prepaid account is debited to reduce the balance to $30.00. At event 308, the cardholder makes a $50.00 purchase at Merchant B. The available balance in the pooled gift card account is $40.00. Accordingly, the available $40.00 in the pooled gift card account is applied to the transaction thereby reducing the balance in the gift card account to zero. The $10.00 deficiency, which is amount still due to cover the transaction at event 380, is debited from the open-loop prepaid account balance to reduce the balance to $20.00.

FIG. 4 shows a block diagram 400 of one example payment system. A combination payment card 401 shown in FIG. 4, for the purposes of illustration, is associated with an open-loop prepaid account associated with a sponsoring network and a closed-loop account associated with a merchant. The combination payment card 401 can be functionally similar to the combination payment card 100 illustrated in FIG. 1. When a cardholder of the combination payment card 401 seeks to use the combination payment card 401 for a payment transaction at merchant 402, account information is received by the point-of-sale (POS) device 404. The account information can be, for example, the card number or other identifying indicia. The account information can be electronically provided to the acquirer 406 using techniques known in the art in the form of an authentication request. Additional information can be conveyed to the acquirer 406 along with the account information. Such additional information can include, for example, such as a merchant identification (MID), a terminal identification, other merchant-specific identifying indicia, and/or other transaction-related data. The transaction-related data can include details about the transaction, such as purchase price, for example. The information received from the POS device 404 can be referred to generally as transaction data.

Upon receiving the transaction data, the acquirer 406 can determine the appropriate treatment for the authorization request. Namely, using various transaction processing rules described herein, the acquirer 406 can determine whether to authorize the purchase as an open-loop transaction, a closed-loop transaction, or a combination of open-loop and closed-loop transactions. At decision 408, the acquirer 406 determines if the card associated with the transaction is a combination payment card. If the card is not a combination payment card, the acquirer 406 can process the transaction as an open-loop transaction, as denoted by block 410, or otherwise process the transaction in accordance with the type of card supplied by the cardholder. The transaction data can then be sent through the payment network 412, as is known in the art, and an authorization 414 (assuming approval of the request by the payment network) returned to the POS device 404. As is to be appreciated by those skilled in the art, the payment network 412 illustrated in FIG. 4 includes the sponsoring network associated with the combination payment card 401.

The determination as to whether the card associated with the transaction is a combination payment card can be based on, for example, the account number received from the POS device 404. In some embodiments, determining whether the card associated with the transaction is a combination payment card includes cross-referencing at least a portion of the account number against a known list of combination payment card account numbers. In other words, the acquirer 406 can identify a range of account numbers that are to be assigned to combination payment cards. When a combination payment cards is issued, it is given an account number from within that range of account numbers. Other techniques can also be used for providing indicia to the combination payment card that can subsequently be used by the acquirer 406 to flag the card as a combination payment card. For example, a particular sequence of numbers can be used in the account number. In some embodiments, a database of known combination payment card account numbers is maintained by an acquirer or other entity. In any event, since a combination payment card can be used for transactions at any open-loop merchant within the sponsoring network, the account number may typically follow standard numbering conventions.

Once it is determined by the acquirer 406 that the card 401 is a combination payment card, it is determined at 416 if the transaction is from a merchant that is associated with the closed-loop prepaid account tied to the card 401. In the illustrated embodiment, for example, it is determined if the merchant 402 is the gift card merchant tied to the account. If merchant 402 is not the gift card merchant tied to the account, the acquirer 406 can process the transaction as an open-loop transaction, as denoted by block 410. If merchant 402 is determined to be the gift card merchant tied to the account, the acquirer 406 can process the transaction as a closed-loop transaction, as denoted by block 418.

In some embodiments, determining whether the merchant associated with the transaction is the merchant tied to the combination payment card includes cross-referencing merchant identifying indicia received from the POS device 404 to merchant-related data stored by the acquirer 406. For example, the data stream received from the POS device 404 can include a MID. After determining that the card 401 is a combination payment card, the incoming MID can be cross-referenced to a list of one or more MIDs associated with that combination payment card. It is noted, however, that the present disclosure is not limited to the use of MIDs, as other merchant identifying indicia can be used by the acquirer 406. In one embodiment, for example, a terminal ID received by the acquirer 406 can be used as merchant identifying indicia. In this way, the combination payment card can be used as a closed-loop card at only certain merchant terminals. The terminal ID received during the transaction can be cross-referenced against a list of acceptable terminal IDs that have been previously identified. Only if the terminal ID is found within the list of acceptable terminal IDs does the acquirer 406 process the transaction as a closed-loop transaction. Thus, using terminal IDs, a merchant can control which stores, or even which POS devices within a single retail location, can process the card 401 as a merchant gift card.

Once the acquirer 406 has determined that the card 401 is a combination payment card and the transaction is occurring at the merchant that is associated with the closed-loop prepaid account, it is determined at 422 if the account balance of the gift card account is sufficient to cover the amount requested. In one embodiment, an authorization request is used to determine if the available account balance of the associated closed-loop prepaid account covers the amount requested. If the account balance is sufficient to cover the amount requested, an authorization 423 can be sent to the POS device 404. The closed-loop prepaid account balance associated with the card 401 can also be reduced by the purchase amount authorized. If, however, the closed-loop prepaid account balance is not sufficient to cover the amount requested, a partial approval can be returned in response to the authorization request. The remaining balance of the requested amount can be treated as an open-loop transaction, as illustrated by block 424. This balance can be sent through the payment network 412, as described above. Thus, if the authorization amount requested from the POS device 404 exceeds the available balance in the closed-loop account associated with the card 401, the acquirer 406 can seek the deficiency from the open-loop prepaid account that is associated with the card 401. If the open-loop prepaid account that is associated with the card 401 does not have sufficient funds, the cardholder may be requested to supply additional types of funds to ultimately complete the transaction.

Figure 5:
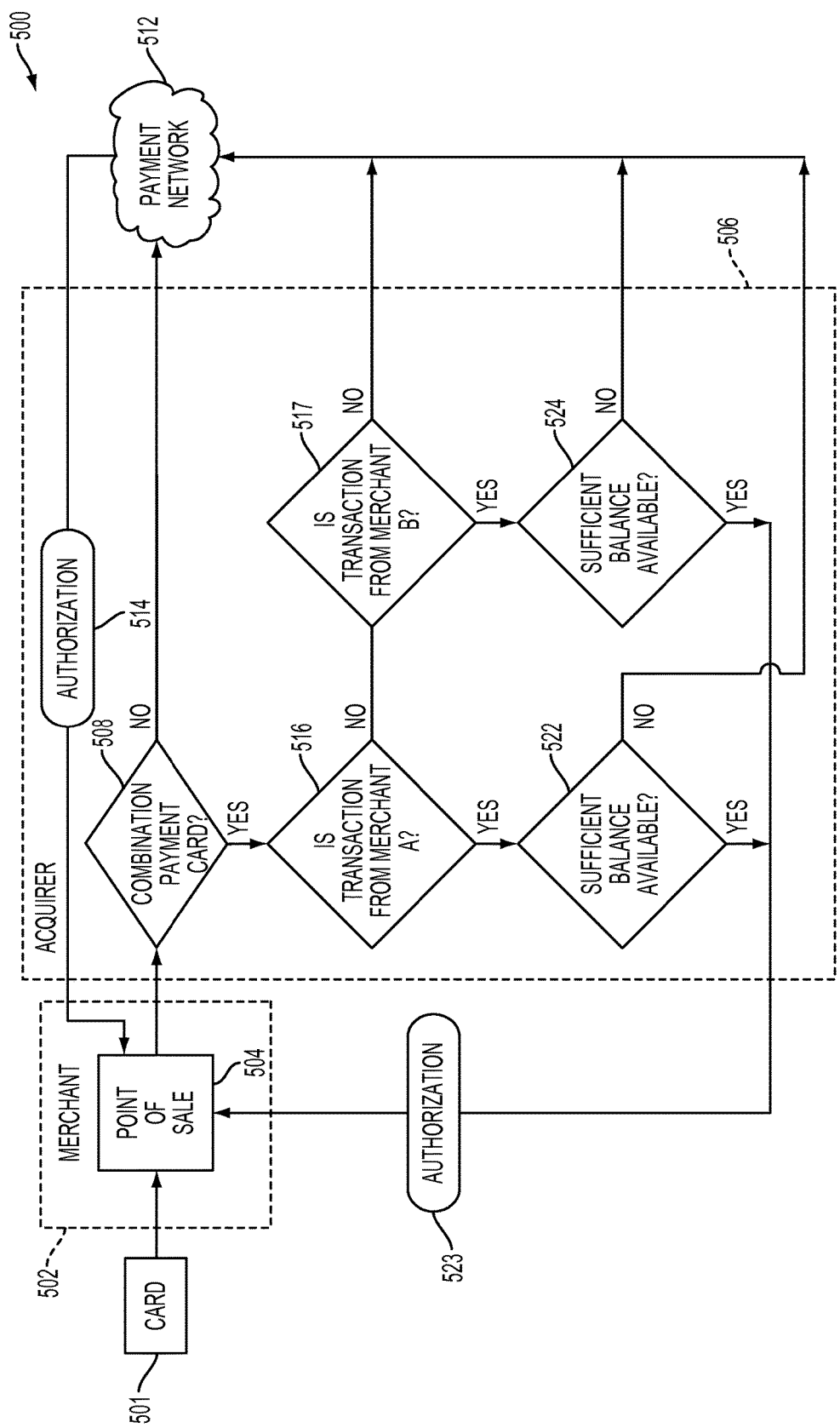

FIG. 5 shows a block diagram 500 of another example payment system. A combination payment card 501 illustrated in FIG. 5, for the purposes of illustration, is associated with an open-loop prepaid account, a closed-loop prepaid account associated with Merchant A, and a closed-loop prepaid account associated with Merchant B. The combination payment card 501 can be functionally similar to the combination payment card 200 shown in FIG. 2. When a cardholder of the combination payment card 501 seeks to use the combination payment card 501 for a payment transaction at merchant 502, account information is received by the point-of-sale (POS) device 504. The account information can be electronically provided to the acquirer 506 using techniques known in the art in the form of an authentication request. Similar to the block diagram 400 described above, additional information can be conveyed to the acquirer 506 along with the account information. Such additional information can include, for example, such as a MID, a terminal ID, other merchant-specific identifying indicia, and/or other transaction-related data.

Upon receiving the transaction data, the acquirer 506 can determine the appropriate treatment for the authorization request. Namely, using various transaction processing rules, the acquirer 506 can determine whether to authorize the purchase as an open-loop transaction, a closed-loop transaction, or a transaction comprising an open-loop component and a closed-loop component. At decision 508, the acquirer 506 determines if the card associated with the transaction is a combination payment card. If the card is not a combination payment card, the acquirer 506 can process the transaction as an open-loop transaction using payment network 512, as is known in the art. The transaction information can then be sent through the payment network 512 and an authorization 514 returned to the POS device 504.

Similar to the decision 408 described above with regard to FIG. 4, the determination at 508 as to whether the card associated with the transaction is a combination payment card can be based on the account number received from the POS device 504. Once it is determined by the acquirer 506 that the card 501 is a combination payment card, it is determined at 516 if the transaction is at a first merchant (illustrated as Merchant A) associated with the closed-loop prepaid account tied to the card 501. If not, it is determined at 517 if the transaction is at a second merchant (illustrated as Merchant B) associated with the closed-loop prepaid account tied to the card 501. As described above with regard to decision 416 in FIG. 4, determining whether the merchant associated with the transaction is the merchant tied to the combination payment card at decision points 516, 517 can include cross-referencing merchant identifying indicia received from the POS device 504 to merchant-related data stored by the acquirer 506. While two merchants are shown associated with a combination payment card in FIG. 5, any suitable number of merchants can be associated with the combination payment card. In any event, if is determined at 517 that merchant 502 is not tied to any gift card account associated with the card 501, the acquirer 506 can process the transaction as an open-loop transaction. The transaction details can be sent to a payment network 512 and authorization 514 returned to the POS device 504.

Referring again to decision 516, if the merchant 502 is determined to be a gift card merchant tied to the account, the acquirer 506 can process the transaction as a closed-loop transaction. At 522, it is determined if the account balance of the closed-loop prepaid account associated with Merchant A is sufficient to cover the amount requested. In one embodiment an authorization request is used to determine if the available account balance of the Merchant A closed-loop prepaid account covers the amount requested. If the account balance is sufficient to cover the amount requested, an authorization 523 can be sent to the POS device 504. The Merchant A closed-loop prepaid account balance associated with the card 501 can also be reduced by the amount authorized. If the account balance in the Merchant A closed-loop prepaid account is not sufficient to cover the amount requested, a partial approval can be returned in response to the authorization request. The remaining balance of the requested amount can be treated as an open-loop transaction. The amount of deficiency can be sent through the payment network 512.

Referring again to decision 517, if the merchant 502 is determined to be a gift card merchant tied to the account, the acquirer 506 can process the transaction as a closed-loop transaction. At 524, it is determined if the account balance of the closed-loop prepaid account associated with Merchant B is sufficient to cover the amount requested. An authorization request can be used to determine if the available account balance of the Merchant B closed-loop prepaid account is sufficient to cover the amount requested. If the account balance is sufficient to cover the amount requested, authorization 523 can be sent to the POS device 504. The Merchant B closed-loop prepaid account balance associated with the card 501 can be reduced by the amount authorized. If, however, the account balance in the Merchant B closed-loop prepaid account is not sufficient to cover the amount requested, a partial approval can be returned and the amount of the deficiency can be treated as an open-loop transaction. The amount of deficiency can be sent through the payment network 512. If the open-loop prepaid account that is associated with the card 501 does not have sufficient funds, the cardholder may be requested to supply additional types of funds to ultimately complete the transaction.

Figure 6:
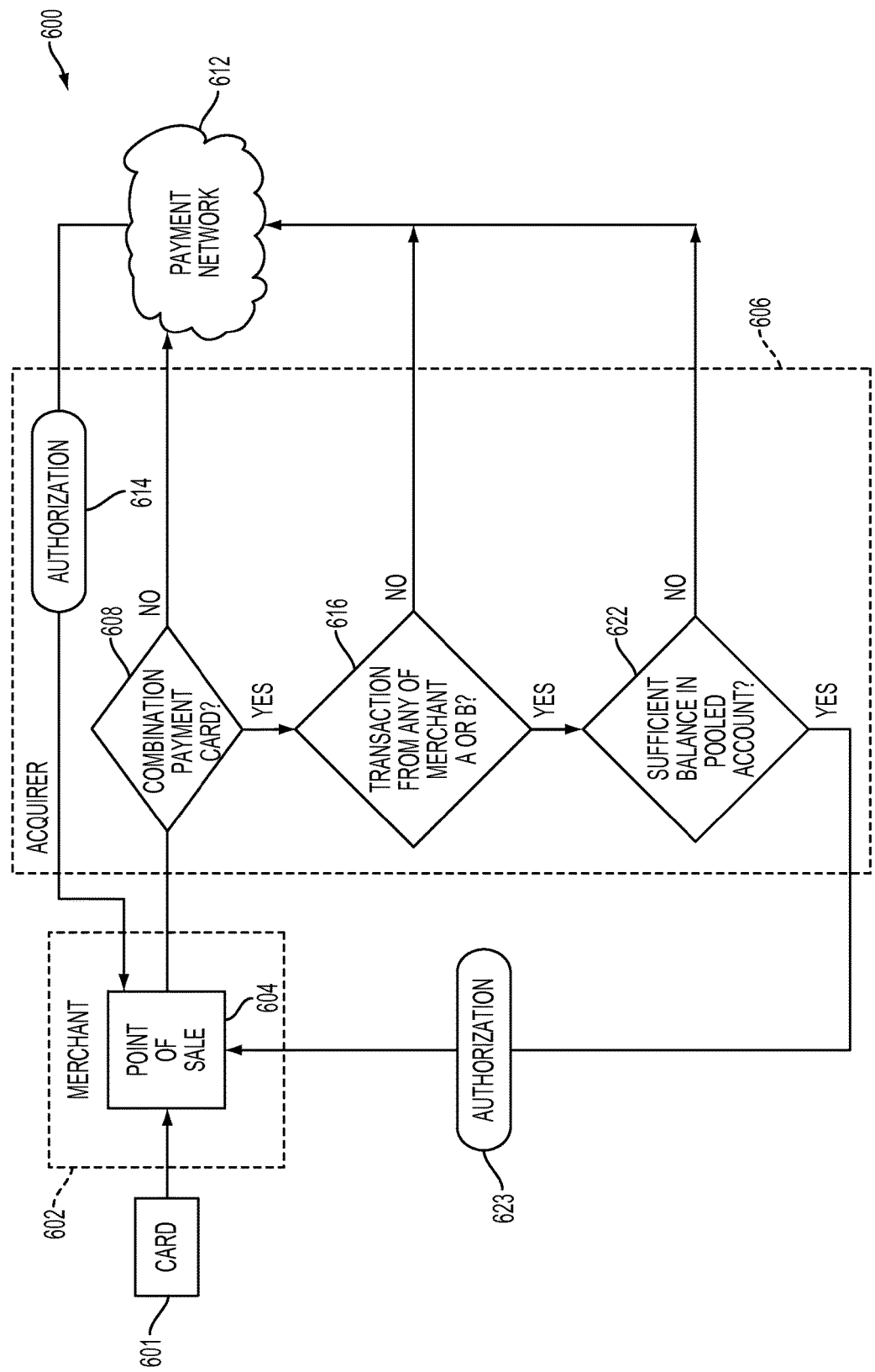

FIG. 6 shows a block diagram 600 of yet another example payment system. A combination payment card 601 illustrated in FIG. 6, for the purposes of illustration, is associated with an open-loop prepaid account and a pooled closed-loop account. The pooled closed-loop account can be associated with any number or types of merchants. For the purposes of illustration, the pooled closed-loop account is associated with Merchant A and Merchant B. The combination payment card 601 can be functionally similar to the combination payment card 300 shown in FIG. 3. When a cardholder of the combination payment card 601 seeks to use the combination payment card 601 for a payment transaction at merchant 602, account information is received by the point-of-sale (POS) device 604. The account information can be electronically provided to the acquirer 606 using transmission techniques known in the art in the form of an authentication request. Similar to the block diagram 400 described above, additional information can be conveyed to the acquirer 606 along with the account information. Such additional information can include, for example, such as a MID, a terminal ID, other merchant-specific identifying indicia, and/or other transaction-related data.

Upon receiving the transaction data, the acquirer 606 can determine the appropriate treatment for the authorization request. Namely, using various transaction processing rules, the acquirer 606 can determine to authorize the purchase as an open-loop transaction, a closed-loop transaction, or a transaction comprising an open-loop component and a closed-loop component. At decision 608, the acquirer 606 determines if the card associated with the transaction is a combination payment card. If the card is not a combination payment card, the acquirer 606 can process the transaction as an open-loop transaction using payment network 612, as is known in the art. The transaction information can then be sent through the payment network 612 and an authorization 614 returned to the POS device 604.

Similar to the decision 408 described above with regard to FIG. 4, the determination at 608 as to whether the card associated with the transaction is a combination payment card can be based on the account number received from the POS device 604. Once it is determined by the acquirer 606 that the card 601 is a combination payment card, it is determined at 616 if the transaction is at a first merchant (illustrated as Merchant A) or at a second merchant (illustrated as Merchant B), both of which are associated with the pooled closed-loop prepaid account tied to the card 601. As described above with regard to decision 416 in FIG. 4, determining whether the merchant associated with the transaction is the merchant tied to the combination payment card at decision points 616 can include cross-referencing merchant identifying indicia received from the POS device 604 to merchant-related data. While two merchants are shown associated a combination payment card in FIG. 6, any suitable number of merchants can be associated with the combination payment card. In any event, if it is determined at 616 that merchant 602 is not a gift card merchant tied to the pooled gift card account associated with the card 601, the acquirer 606 can process the transaction as an open-loop transaction. The transaction details can be sent to a payment network 612 and authorization 614 returned to the POS device 604.

If the merchant 602 is determined at decision 616 to be a gift card merchant tied to the pooled gift card account, the acquirer 606 can process the transaction as a closed-loop transaction. At 622, it is determined if the account balance of the closed-loop prepaid account associated with merchant 602 is sufficient to cover the amount requested. Similar to the embodiments described above, an authorization request can be used to determine if the available account balance of the pooled closed-loop prepaid account covers the amount requested. If the account balance is sufficient to cover the amount requested, authorization 623 can be sent to the POS device 604. The pooled gift card account balance associated with the card 601 can be reduced by the amount authorized. If the account balance in the pooled gift card account is not sufficient to cover the amount requested, a partial approval can be returned in response to the authorization request. The remaining balance of the requested amount can be sent through the payment network 612 as an open-loop transaction, as illustrated in FIG. 6. If the open-loop prepaid account that is associated with the card 601 does not have sufficient funds, the cardholder may be requested to supply additional types of funds to ultimately complete the transaction.

Figure 7:
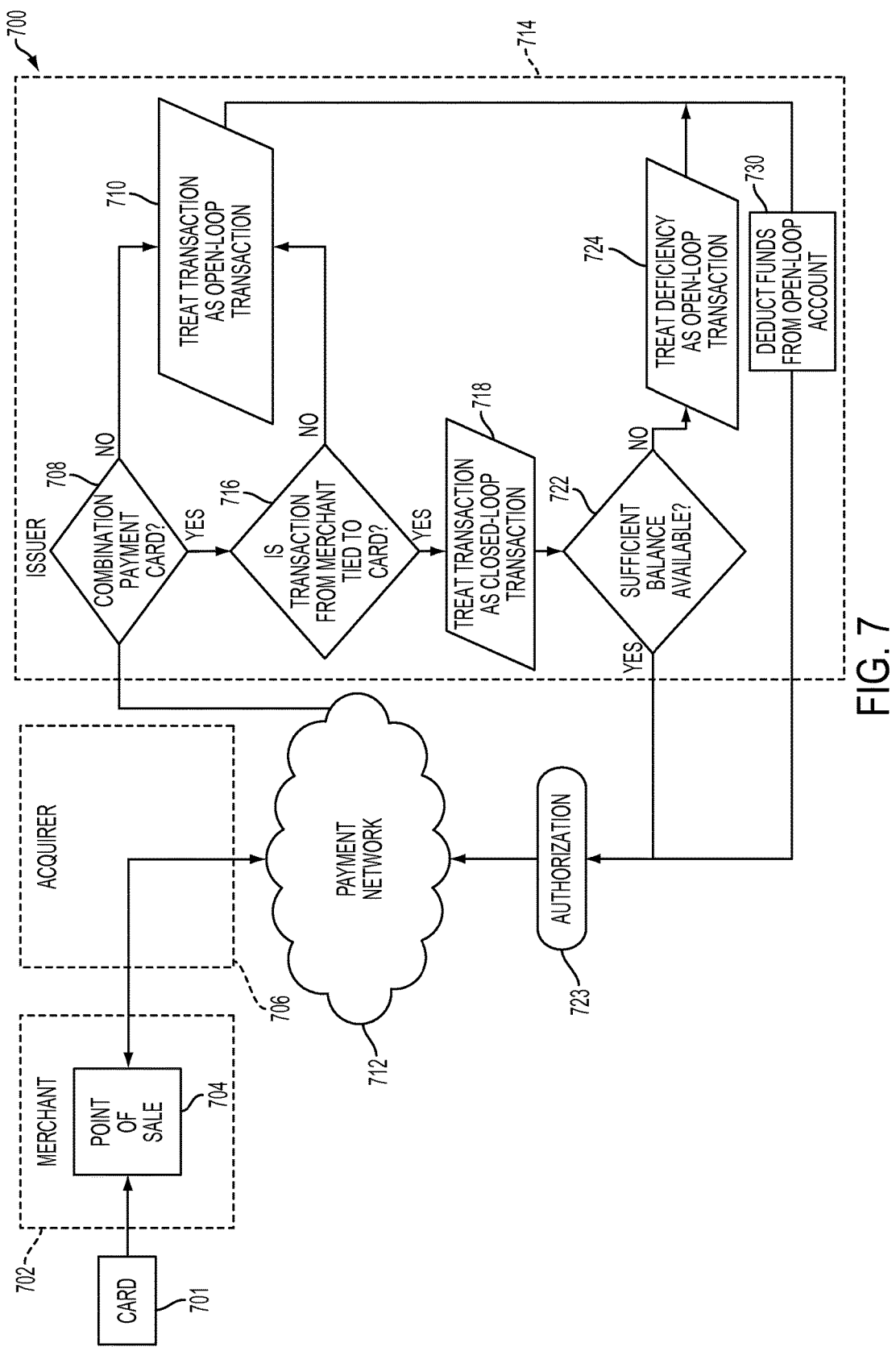
FIGS. 7-9 show block diagrams of example payment systems with issuer-side combination payment card processing in accordance with various non-limiting embodiments.

FIG. 7 shows a block diagram 700 of one example payment system having issuer-side combination payment card processing functionality. A combination payment card 701 shown in FIG. 7, for the purposes of illustration, is associated with an open-loop prepaid account associated with a sponsoring network and a closed-loop account associated with a merchant. The combination payment card 701 can be functionally similar to the combination payment card 100 illustrated in FIG. 1, for example. When a cardholder of the combination payment card 701 seeks to use the combination payment card 701 for a payment transaction at merchant 702, account information is received by the point-of-sale (POS) device 704. The account information can be, for example, the card number or other identifying indicia. The account information can be electronically provided to an acquirer 706 using techniques known in the art in the form of an authentication request. Along with the account information, additional information can be conveyed to the acquirer 706 and on through payment network 712 to the issuer 714. Such additional information can include, for example, a merchant identification (MID), a terminal identification, other merchant-specific identifying indicia, and/or other transaction-related data. The transaction-related data can include details about the transaction, such as purchase price, for example. The information received from the POS device 404 can be referred to generally as transaction data.

Upon receiving the transaction data, the issuer 714 can determine the appropriate treatment for the authorization request. Namely, using various transaction processing rules described herein, the issuer 714 can determine whether to authorize the purchase as an open-loop transaction, a closed-loop transaction, or a combination of open-loop and closed-loop transactions.

At decision 708, the issuer 714 determines if the card associated with the transaction is a combination payment card. If the card is not a combination payment card, the issuer 714 can process the transaction as an open-loop transaction, as denoted by block 710, or otherwise process the transaction in accordance with the type of card supplied by the cardholder. As illustrated by block 730, as part of the open-loop processing, an amount of funds can be deducted from the appropriate open-loop account associated with the transaction. The transaction data can then be sent through the payment network 712, as is known in the art, and an authorization 723 returned to the acquirer 706. As is to be appreciated by those skilled in the art, the payment network 712 illustrated in FIG. 7 includes the sponsoring network associated with the combination payment card 701.

The determination as to whether the card associated with the transaction is a combination payment card can be based on, for example, the account number received from the POS device 704. In some embodiments, determining whether the card associated with the transaction is a combination payment card includes cross-referencing at least a portion of the account number against a known list of combination payment card account numbers. In other words, the issuer 714 can identify a range of account numbers that are to be assigned to combination payment cards. When a combination payment card is issued, it is given an account number from within that particular range of account numbers. Other techniques can also be used for providing indicia to the combination payment card that can subsequently be used by the issuer 714 to flag the card as a combination payment card. For example, a particular sequence of numbers can be used in the account number. In some embodiments, a database of known combination payment card account numbers is maintained by an issuer or other entity. In any event, since a combination payment card can be used for transactions at any open-loop merchant within the sponsoring network, the account number may typically follow standard numbering conventions so that it can be processed by standard POS devices and associated acquirers.

Still referring to FIG. 7, once it is determined by the issuer 714 that the card 701 is a combination payment card, it is determined at 716 if the transaction is from a merchant that is associated with the closed-loop prepaid account tied to the card 702. In the illustrated embodiment, for example, it is determined if the merchant 702 is the gift card merchant tied to the account. If merchant 702 is not the gift card merchant tied to the account, the issuer 714 can process the transaction as an open-loop transaction, as denoted by block 710. If the merchant 702 is determined to be the gift card merchant tied to the account, the issuer 714 can process the transaction as a closed-loop transaction, as denoted by block 718. As is to be appreciated, and similar to other embodiments described herein, the determination of whether the transaction is from a merchant tied to the gift card merchant can be performed before determining if the card used to initiate the transaction is a combination card. The particular order shown in FIG. 7 and other figures is merely for pedagogical purposes and not intended to be limiting.

In some embodiments, determining whether the merchant associated with the transaction is the merchant tied to the combination payment card includes cross-referencing various merchant identifying indicia received from the acquirer 706 (as received through the payment network 712) to merchant-related data stored by, or at least accessible by, the issuer 714. For example, the data stream received from the acquirer 706 can include a MID. After determining that the card 701 is a combination payment card, the incoming MID can be cross-referenced to a list of one or more MIDs associated with that combination payment card. It is noted, however, that the present disclosure is not limited to the use of MIDs, as other merchant identifying indicia can be used by the issuer 714. In one embodiment, for example, a terminal ID received by the issuer 714 can be used as merchant identifying indicia. In this way, the combination payment card can be configured to function as a closed-loop card at only certain merchant terminals. The terminal ID received during the transaction can be cross-referenced against a list of acceptable terminal IDs that have been previously identified. Only if the terminal ID is found within the list of acceptable terminal IDs does the issuer 714 process the transaction as a closed-loop transaction. Thus, using terminal IDs, a merchant can control which stores, or even which POS devices within a single retail location, can process the card 701 as a merchant gift card.

Once the issuer 714 has determined that the card 701 is a combination payment card and the transaction is occurring at the merchant that is associated with the closed-loop prepaid account, it is determined at 722 if the account balance of the gift card account is sufficient to cover the amount requested. If the account balance is sufficient to cover the amount requested, the authorization 723 can be sent to the acquirer 706 via the payment network 712, as is known in the art. The closed-loop prepaid account balance associated with the card 701 can also be reduced by the purchase amount authorized. If, however, the closed-loop prepaid account balance is not sufficient to cover the amount requested, a partial approval can be returned in response to the authorization request. The remaining balance of the requested amount can be treated as an open-loop transaction, as illustrated by block 724. This balance can be deducted, for example, from an open-loop account at block 730. Thus, if the authorization amount requested from the POS device 704 exceeds the available balance in the closed-loop account associated with the card 701, the issuer 714 can seek the deficiency from the open-loop prepaid account that is associated with the card 701. If the open-loop prepaid account that is associated with the card 701 does not have sufficient funds, the cardholder may be requested to supply additional types of funds to ultimately complete the transaction.

Figure 8:
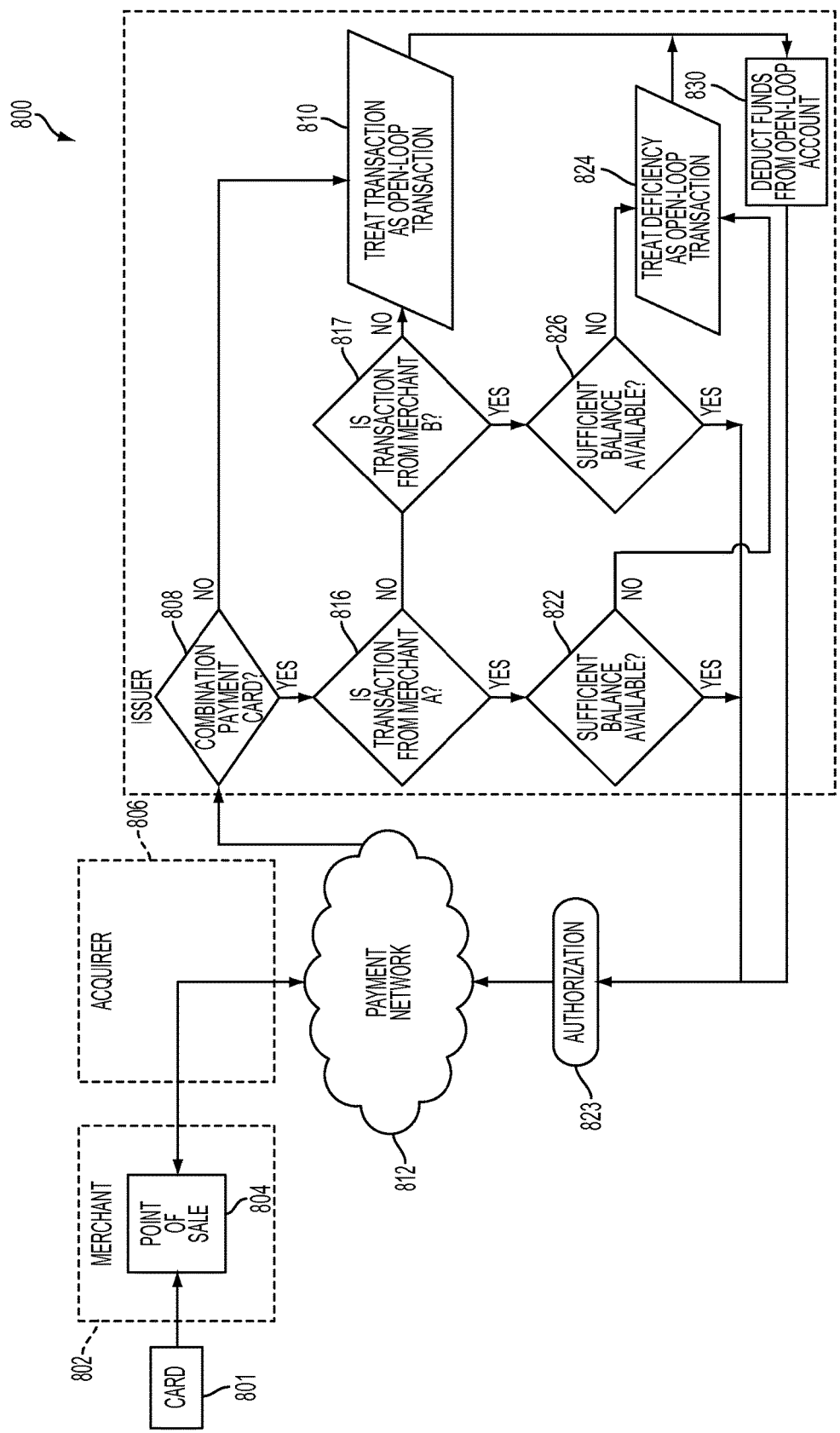

FIG. 8 shows a block diagram 800 of another example payment system having issuer-side combination payment card processing functionality. A combination payment card 801 shown in FIG. 8, for the purposes of illustration, is associated with an open-loop prepaid account and multiple closed-loop prepaid accounts, namely, a closed-loop prepaid account associated with Merchant A and a closed-loop prepaid account associated with Merchant B. The combination payment card 801 can be functionally similar to the combination payment card 200 shown in FIG. 2, for example. When a cardholder of the combination payment card 801 seeks to use the combination payment card 801 for a payment transaction at a merchant 802, account information is received by the point-of-sale (POS) device 804. The account information can be electronically provided to an acquirer 806 using techniques known in the art in the form of an authentication request, as is known in the art. Along with the account information, additional information can be conveyed to the acquirer 806 and on through payment network 812 to the issuer 814. Such additional information can include, for example, such as a MID, a terminal ID, other merchant-specific identifying indicia, and/or other transaction-related data.

Upon receiving the transaction data, the issuer 814 can determine the appropriate treatment for the authorization request. Namely, using various transaction processing rules, the issuer 814 can determine whether to authorize the purchase as an open-loop transaction, a closed-loop transaction, or a transaction comprising an open-loop component and a closed-loop component. At decision 808, the issuer 814 determines if the card associated with the transaction is a combination payment card. If the card is not a combination payment card, the issuer 814 can treat the transaction as an open-loop transaction, as indicated by block 810. As illustrated by block 830, as part of the open-loop processing, an amount of funds can be deducted from the appropriate open-loop account. Similar to the decision 708 described above with regard to FIG. 7, the determination at 808 as to whether the card associated with the transaction is a combination payment card can be based on the account number received from the POS device 804. Once it is determined by the issuer 814 that the card 801 is a combination payment card, it is determined at 816 if the transaction is at a first merchant (illustrated as Merchant A) associated with the closed-loop prepaid account tied to the card 801. If not, it is determined at 817 if the transaction is at a second merchant (illustrated as Merchant B) associated with the closed-loop prepaid account tied to the card 801. As described above with regard to decision 716 in FIG. 7, determining whether the merchant associated with the transaction is the merchant tied to the combination payment card at decision points 816, 817 can include cross-referencing merchant identifying indicia received from the POS device 804 to merchant-related data stored by, or at least accessible by, the issuer 814. While two merchants are shown associated with a combination payment card in FIG. 8, any suitable number of merchants can be associated with the combination payment card. In one embodiment, for example, three or more different merchants are associated with the combination payment card. In another embodiment, twenty or more different merchants are associated with the combination payment card. In any event, if is determined at 817 that merchant 802 is not tied to any gift card account associated with the card 801, the issuer 814 can process the transaction as an open-loop transaction, as illustrated in FIG. 8.

Referring again to decision 816, if the merchant 802 is determined to be a gift card merchant tied to the account (shown as Merchant A), the issuer 814 can process the transaction as a closed-loop transaction. At 822, it is determined if the account balance of the closed-loop prepaid account associated with Merchant A is sufficient to cover the amount requested. If the account balance is sufficient to cover the amount requested, an authorization 823 can be sent to the acquirer 806 by way of the payment network 812. The Merchant A closed-loop prepaid account balance associated with the card 801 can also be reduced by the amount authorized. If the account balance in the Merchant A closed-loop prepaid account is not sufficient to cover the amount requested, in some embodiments a partial approval can be returned in response to the authorization request. The remaining balance of the requested amount can be treated as an open-loop transaction, as indicated by block 824. The amount of deficiency can be deducted from the open-loop account at block 830 and the transaction can be completed.

Referring again to decision 817, if the merchant 802 is determined to be a gift card merchant tied to the account (shown as Merchant B), the issuer 814 can process the transaction as a closed-loop transaction. At 826, it is determined if the account balance of the closed-loop prepaid account associated with Merchant B is sufficient to cover the amount requested. If the account balance is sufficient to cover the amount requested, the authorization 823 can be sent to the acquirer 806 via the payment network 812. The Merchant B closed-loop prepaid account balance associated with the card 801 can be reduced by the amount authorized. If, however, the account balance in the Merchant B closed-loop prepaid account is not sufficient to cover the amount requested, a partial approval can be returned and the amount of the deficiency can be treated as an open-loop transaction, as indicated by block 824. If the open-loop prepaid account that is associated with the card 801 does not have sufficient funds, the cardholder may be requested to supply additional types of funds to ultimately complete the transaction.

Figure 9:
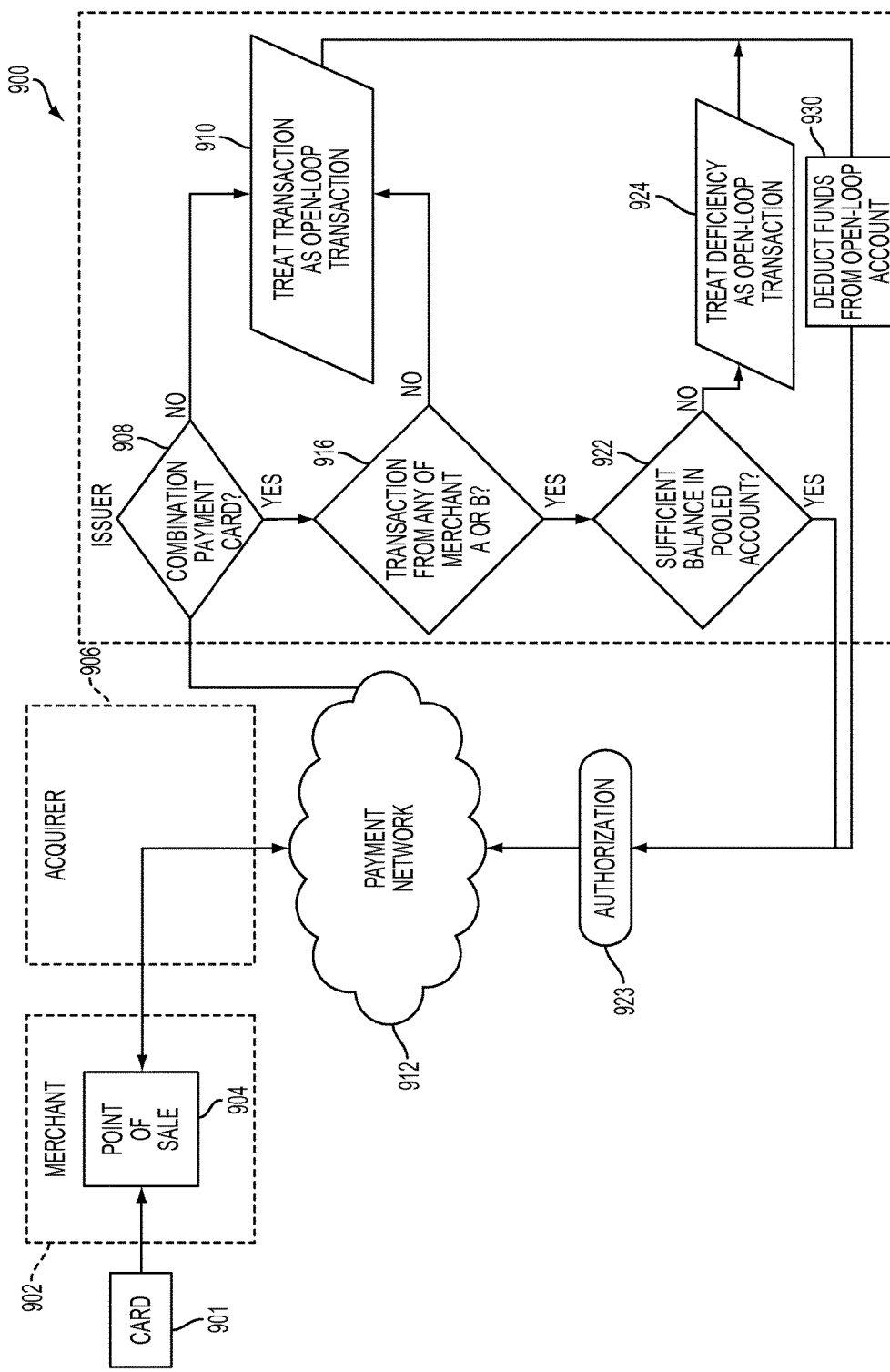

FIG. 9 shows a block diagram 900 of yet another example payment system having issuer-side combination payment card processing functionality. A combination payment card 901 shown in FIG. 9, for the purposes of illustration, is associated with an open-loop prepaid account and a pooled closed-loop account. The pooled closed-loop account can be associated with any number or types of merchants. For the purposes of illustration, the pooled closed-loop account is associated with Merchant A and Merchant B. The combination payment card 901 can be functionally similar to the combination payment card 300 shown in FIG. 3, for example. When a cardholder of the combination payment card 901 seeks to use the combination payment card 901 for a payment transaction at merchant 902, account information is received by the point-of-sale (POS) device 904. The account information can be electronically provided to the issuer 914, by way of an acquirer 906 and a payment network 912, as is known in the art. Additional information can be conveyed to the issuer 914, such as, for example, a MID, a terminal ID, other merchant-specific identifying indicia, and/or other transaction-related data.

Upon receiving the transaction data, the issuer 914 can determine the appropriate treatment for the authorization request. Namely, using various transaction processing rules, the issuer 914 can determine to authorize the purchase as an open-loop transaction, a closed-loop transaction, or a transaction comprising an open-loop component and a closed-loop component. At decision 908 the issuer 914 determines if the card associated with the transaction is a combination payment card. If the card is not a combination payment card, the issuer 914 can process the transaction as an open-loop transaction, as indicated by block 910. Funds can be deducted from an open-loop account at 730 and an authorization 923 returned to the acquirer 906 via the payment network 912.

Similar to the decision 708 described above with regard to FIG. 7, the determination at 908 as to whether the card associated with the transaction is a combination payment card can be based on the account number received from the POS device 604. Once it is determined by the issuer 914 that the card 901 is a combination payment card, it is determined at 916 if the transaction is at a first merchant (illustrated as Merchant A) or at a second merchant (illustrated as Merchant B), both of which are associated with the pooled closed-loop prepaid account tied to the card 901. As described above with regard to decision 716 in FIG. 7, determining whether the merchant associated with the transaction is the merchant tied to the combination payment card at decision point 916 can include cross-referencing merchant identifying indicia received from the POS device 904 to merchant-related data stored by, or at least accessible by, the issuer 914. While two merchants are shown associated a combination payment card in FIG. 9, any suitable number of merchants can be associated with the combination payment card. In any event, if it is determined at decision 916 that merchant 902 is not a gift card merchant tied to the pooled gift card account associated with the card 901, the issuer 914 can process the transaction as an open-loop transaction, as illustrated.

If the merchant 902 is determined at decision 916 to be a gift card merchant tied to the pooled gift card account, the issuer 914 can process the transaction as a closed-loop transaction. At 922, it is determined if the account balance of the pooled closed-loop prepaid account associated with merchant 602 is sufficient to cover the amount requested. If the account balance is sufficient to cover the amount requested, an authorization 923 can be sent to the acquirer 906 via the payment network 912. The pooled gift card account balance associated with the card 901 can be reduced by the amount authorized. If the account balance in the pooled gift card account is not sufficient to cover the amount requested, a partial approval can be returned in response to the authorization request. The remaining balance of the requested amount can be treated as an open-loop transaction, as illustrated in FIG. 9. If the open-loop prepaid account that is associated with the card 901 does not have sufficient funds, the cardholder may be requested to supply additional types of funds to ultimately complete the transaction.

Figure 10:
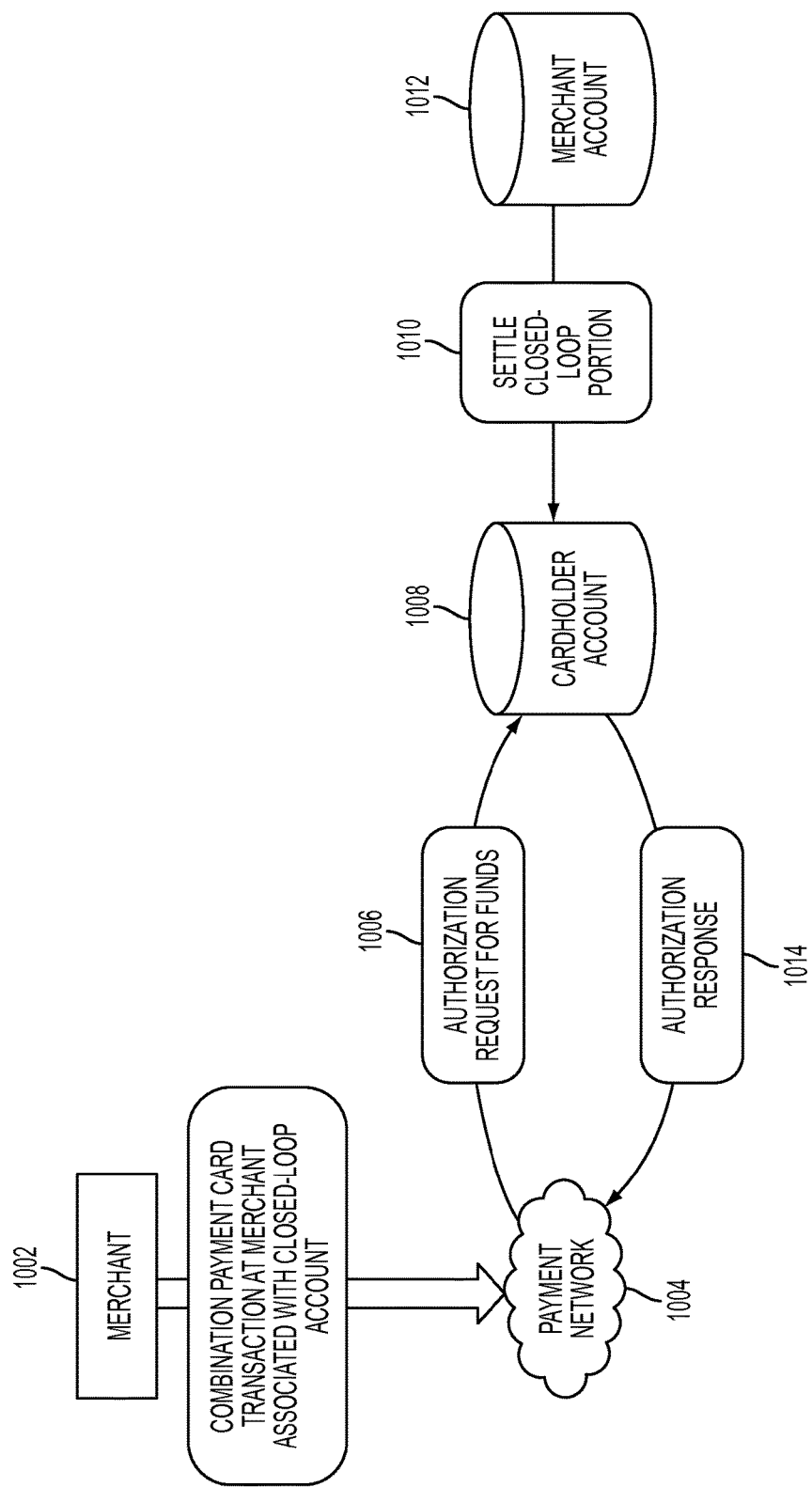
FIG. 10 schematically shows the flow of funds between various entities and accounts for issuer-side combination card processing in accordance with one non-limiting embodiment.

FIG. 10 schematically shows the flow of funds between various entities and accounts for issuer-side combination card processing in accordance with one non-limiting embodiment. A combination payment card transaction 1002 is initiated at a merchant 1002 associated with a closed-loop account of the combination payment card. The transaction propagates through the payment network 1004, as is known in the art. The transaction can comprise an authorization request for a particular amount of funds. For the purposes of illustration, the authorization request 1006 is for $100 and the combination payment card is associated with a $5 gift card amount. The combination payment card is also associated with an open-loop account holding over $100. In the illustrated embodiment, the cardholder account 1008 is debited the full $100 in response to the authorization request. An authorization response 1014 is returned to the merchant 1002 through the payment network 1004. Assuming combination payment card transaction 1002 was initiated at a merchant associated with the $5 gift card amount, subsequent settlements occur to effectuate the application of the gift card amount. Namely, the closed-loop portion 1010 (i.e., $5 in the illustrated embodiment) is settled from a merchant account 1012 to the cardholder account 1008. Accordingly, the cardholder account 1008 is credited to increase the balance of the cardholder account 1008 by the amount of the gift card.

Figure 11:
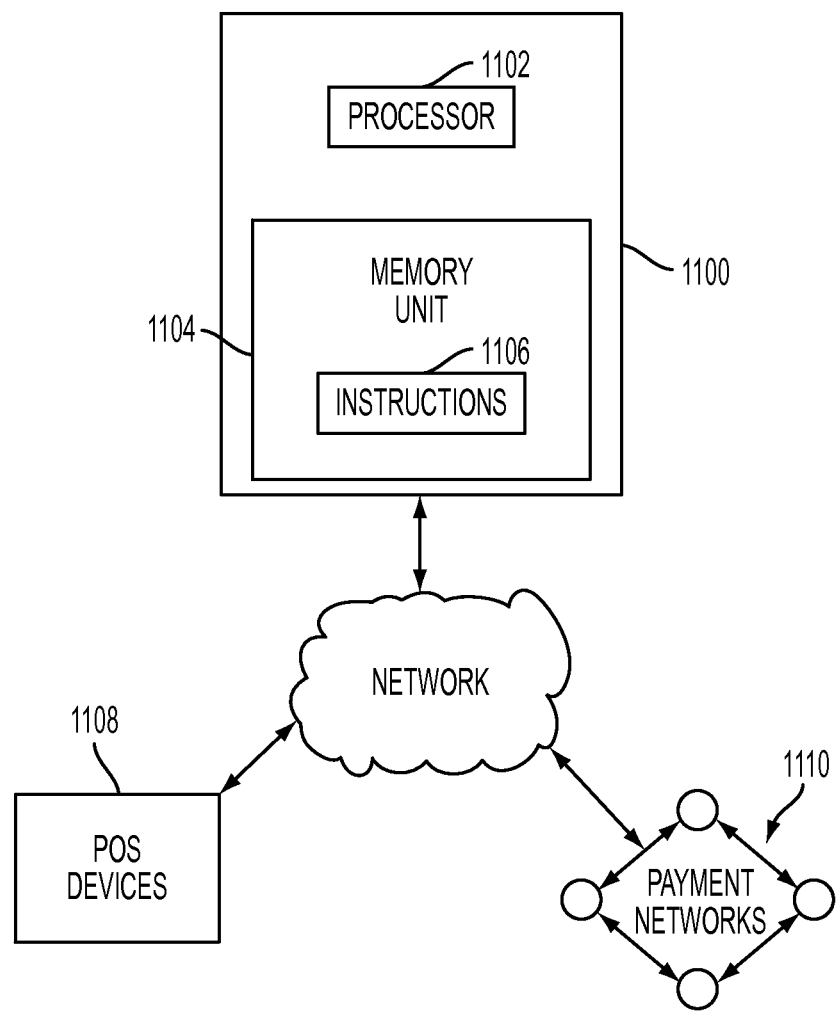
FIG. 11 shows one example of a payment controller that receives and processes payment transactional information.

FIG. 11 shows one example embodiment of a payment controller 1100 that receives and processes payment transactional information. The payment controller 1100 can be used to execute the transaction rules of the acquirers 406, 506, 606 of FIGS. 4-6 and issuers 714, 814, and 914 of FIGS. 7-9, described above. The payment controller 1100 may be provided using any suitable processor-based device or system, such as a personal computer, laptop, server, mainframe, or a collection (e.g., network) of multiple computers, for example. The payment controller 1100 may include one or more processors 1102 and one or more computer memory units 1104. For convenience, only one processor 1102 and only one memory unit 1104 are shown in FIG. 11. The processor 1102 may execute software instructions 1106 stored on the memory unit 1104. The processor 1102 may be implemented as an integrated circuit (IC) having one or multiple cores. The memory 1104 may include volatile and/or non-volatile memory units. Volatile memory units may include random access memory (RAM), for example. Non-volatile memory units may include read only memory (ROM), for example, as well as mechanical non-volatile memory systems, such as, for example, a hard disk drive, an optical disk drive, etc. The RAM and/or ROM memory units may be implemented as discrete memory ICs, for example. Data used by the payment controller 1100 may be from various sources, such as point-of-sale device 1108 database. The payment controller 1100 can also be in communication with various payment networks 1110. The payment network 1110 can generally comprise, for example, the sponsoring network of the combination payment cards described herein, the issuer processor, the issuer bank, and any other intermediaries that process financial transactions.

In general, it will be apparent to one of ordinary skill in the art that at least some of the embodiments described herein may be implemented in many different embodiments of software, firmware, and/or hardware. The software and firmware code may be executed by a processor or any other similar computing device. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes associated with the present embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semipermanent, and/or semitemporary.

A "computer," "computer system," "host," "server," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software modules used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media. Non-transitory computer-readable media, as used herein, comprises all computer-readable media except for a transitory, propagating signals.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm" or other grouping of networked servers (such as server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand and/or providing backup contingency in the event of component failure or reduction in operability.

The computer systems may comprise one or more processors in communication with memory (e.g., RAM or ROM) via one or more data buses. The data buses may carry electrical signals between the processor(s) and the memory. The processor and the memory may comprise electrical circuits that conduct electrical current. Charge states of various components of the circuits, such as solid state transistors of the processor(s) and/or memory circuit(s), may change during operation of the circuits.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a computer, a firmware element embedded in hardware, or any combination thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

What is claimed is:

1. A non-transitory computer readable medium having instructions stored thereon which, when executed by a processor of an acquirer configured to process both open-loop transactions and closed-loop transactions, cause the processor to:
   receive, at the processor of the acquirer, transaction information from a point-of-sale device through a sponsoring network, the point-of-sale device being located remotely from the processor of the acquirer and accepting a combination payment card associated with at least one of a closed-loop account and an open-loop account, and the transaction information comprising an authorization request, a payment card account number, a terminal identifier, and a merchant identifier;
   determine, using the processor of the acquirer, whether the payment card account number identifies a combination payment card, wherein the combination payment card has an assigned card number that is associated with both the closed-loop account and the open-loop account by cross-referencing at least a portion of the account number against a known list of combination payment card accounts remotely from the point-of-sale device, wherein the closed-loop account associated with the assigned card number is affiliated with a closed-loop merchant and the open-loop account associated with the assigned card number is affiliated with the sponsoring network;
   if the payment card account number identifies the combination payment card and the transaction information is received from the closed-loop merchant:
     transmit, using the processor of the acquirer, an authorization of sale to the point-of-sale device through the sponsoring network based on determining the closed-loop account has sufficient funds, or
     communicate, using the processor of the acquirer, with the sponsoring network to determine whether the open-loop account has sufficient funds to cover an amount of deficiency in the closed-loop account based on determining the closed-loop account has insufficient funds;
   if the payment card account number identifies the combination payment card and the transaction information is not received from the closed-loop merchant:
     transmit, using the processor of the acquirer, an authorization of sale to the point-of-sale device through the sponsoring network based on determining the open-loop account has sufficient funds, or
     request, via a first prompt at the point-of-sale device, an additional type of funds based on determining the open-loop account has insufficient funds; and
   if the payment card account number does not identify the combination payment card, determine, using the processor of the acquirer, whether a payment card account identified by the payment card account number has sufficient funds to cover the authorization request and transmit, using the processor of the acquirer, an authorization of sale to the point-of-sale device through the sponsoring network based on determining the payment card account has sufficient funds.

2. The non-transitory computer readable medium of claim 1, wherein the assigned card number of the combination payment card is associated with a plurality of closed-loop accounts, wherein each of the plurality of closed-loop accounts is affiliated with a respective closed-loop merchant.

3. The non-transitory computer readable medium of claim 1, wherein the closed-loop account is affiliated with a plurality of closed-loop merchants.

4. The non-transitory computer readable medium of claim 1, wherein determining whether the payment card account number identifies a combination payment card comprises comparing least a portion of the payment card account number to a plurality of combination payment card account numbers.

5. The non-transitory computer readable medium of claim 4, wherein the plurality of combination payment card account numbers comprises a range of bank identification numbers (BINs).

6. The non-transitory computer readable medium of claim 4, wherein the plurality of combination payment card account numbers comprises a range of issuer identification numbers (IINs).

7. The non-transitory computer readable medium of claim 1, wherein the instructions, when executed by the processor, further cause the processor to:
   transmit, through the sponsoring network, a second prompt for a cardholder to the point-of-sale device, the prompt requesting the cardholder to identify one of the closed-loop account or the open-loop account to use for an authorization of sale to be transmitted to the acquirer through the sponsoring network, when the payment card account number identifies the combination payment card.

8. A non-transitory computer readable medium having instructions stored thereon which, when executed by a processor of an acquirer configured to process both open-loop transactions and closed-loop transactions, cause the processor to:
   receive, at the processor of the acquirer, transaction information from a point-of-sale device through a sponsoring network, the point-of-sale device being located remotely from the processor of the acquirer and accepting a combination payment card associated with at least one of a closed-loop account and a prepaid account, and the transaction information comprising an authorization request, a payment card account number, a terminal identifier, and a merchant identifier;
   determine, using the processor of the acquirer, whether the payment card account number identifies a combination payment card by cross-referencing at least a portion of the account number against a known list of combination payment card accounts remotely from the point-of-sale device, wherein the combination payment card has an assigned card number that is associated with both closed-loop account that is affiliated with a merchant and the prepaid account that is affiliated with the sponsoring network;
   if the payment card account number identifies the combination payment card and the transaction information is received from the merchant:
      transmit, using the processor of the acquirer, an authorization of sale to the point-of-sale device through the sponsoring network based on determining the closed-loop account has sufficient funds, or
      communicate, using the processor of the acquirer, with the sponsoring network to determine whether the prepaid account has sufficient funds to cover an amount of deficiency in the closed-loop account based on determining the closed-loop account has insufficient funds;
   if the payment card account number identifies the combination payment card and the transaction information is not received from the merchant:
      transmit, using the processor of the acquirer, an authorization of sale to the point-of-sale device through the sponsoring network based on determining the prepaid account has sufficient funds, or
      request, via a first prompt at the point-of-sale device, an additional type of funds based on determining the prepaid account has insufficient funds; and
   if the payment card account number does not identify the combination payment card, determine, using the processor of the acquirer, whether a payment card account associated with the payment card account number has sufficient funds to cover the authorization request and transmit, using the processor of the acquirer, an authorization of sale to the point-of-sale device through the sponsoring network based on determining the payment card account has sufficient funds.

9. The non-transitory computer readable medium of claim 8, wherein the assigned card number of the combination payment card is associated with a plurality of closed-loop accounts.

10. The non-transitory computer readable medium of claim 8, wherein determining whether the payment card account number is associated with a combination payment card comprises comparing at least a portion of the payment card account number to the assigned account number of a combination payment card.

11. The non-transitory computer readable medium of claim 8, wherein determining whether the combination payment card is associated with the merchant comprises comparing the merchant identifier in the transaction information to a merchant identifier associated with the closed-loop account.

12. The non-transitory computer readable medium of claim 8, wherein the instructions, when executed by the processor, further cause the processor to:
   transmit, through the sponsoring network, a second prompt for a cardholder at the point-of-sale device, the prompt requesting the cardholder to identify one of the closed-loop account or the prepaid account to use for an authorization to be transmitted to the acquirer through the sponsoring network, when the payment card account number is associated with a combination payment card.

13. A payment processing system, comprising:
   a combination payment card, wherein the combination payment card has an assigned card number that is associated with both a closed-loop account and an open-loop account, wherein the closed-loop account associated with the assigned card number is affiliated with a closed-loop merchant and the open-loop account associated with the assigned card number is affiliated with a sponsoring network;
   a payment processor, wherein the payment processor is one of an acquirer and an issuer, wherein the payment processor is configured to:
      receive transaction information from a point-of-sale device connected to the payment processor through a sponsoring network, the point-of-sale device being located remotely from the payment processor and accepting the combination payment card, and the transaction information comprising an authorization request, a payment card account number, a terminal identifier, and a merchant identifier;

determine whether the payment card account number identifies the combination payment card by cross-referencing at least a portion of the account number against a known list of combination payment card accounts remotely from the point-of-sale device;

if the payment card account number identifies the combination payment card and the received transaction information is associated with the closed-loop merchant:

transmit an authorization of sale to the point-of-sale device through the sponsoring network based on determining the closed-loop account has sufficient funds, or communicate with the sponsoring network to determine whether the open-loop account has sufficient funds to cover an amount of deficiency in the closed-loop account based on determining the closed-loop account has insufficient funds;

if the payment card account number identifies the combination payment card and the received transaction information is not associated with the closed loop merchant:

transmit an authorization of sale to the point-of-sale device through the sponsoring network based on determining the open-loop account has sufficient funds, or request, via a first prompt at the point-of-sale device, an additional type of funds based on determining the open-loop account has insufficient funds; and if the payment card account number does not identify the combination payment card, determine whether a payment card account identified by the payment card account number has sufficient funds and transmit an authorization of sale to the point-of-sale device through the sponsoring network based on determining the payment card account has sufficient funds.

14. The payment processing system of claim 13, wherein the closed-loop account is a pooled gift card account.

15. The payment processing system of claim 13, wherein the open-loop account is a prepaid account associated with the sponsoring network.

16. The payment processing system of claim 13, wherein the assigned card number comprises a bank identification number (BIN).

17. The payment processing system of claim 13, wherein the assigned card number comprises an issuer identification number (IN).

18. The payment processing system of claim 13, wherein the combination payment card is a physical card.

19. The payment processing system of claim 13, wherein the payment processor is further configured to:

transmit a second prompt for a cardholder at the point-of-sale device, the prompt requesting the cardholder to identify one of the closed-loop account or the open-loop account to use for an authorization of sale to be transmitted, when the payment card account number identifies the combination payment card.

\* \* \* \* \*

UNITED STATES PATENT AND TRADEMARK OFFICE
CERTIFICATE OF CORRECTION

PATENT NO. : 10,096,020 B2
APPLICATION NO. : 14/221792
DATED : October 9, 2018
INVENTOR(S) : Bryan T. Bailey and Edward D. Paciolla It is certified that error appears in the above-identified patent and that said Letters Patent is hereby corrected as shown below:

In the Claims

In Claim 4, Column 21, Line 7, delete "least" and insert --at least--.

Signed and Sealed this
Twenty-fifth Day of December, 2018

Andrei Iancu
*Director of the United States Patent and Trademark Office*